April 29, 1969  E. A. EAGELL  3,441,439
APPARATUS AND METHOD FOR REDUCING FOULING
OF UNDERWATER SURFACES
Filed Oct. 18, 1965

Eric Alec Eagell
INVENTOR

BY Wenderoth, Lind
and Ponack ATTORNEYS

United States Patent Office 3,441,439
Patented Apr. 29, 1969

3,441,439
APPARATUS AND METHOD FOR REDUCING
FOULING OF UNDERWATER SURFACES
Eric Alec Eagell, Tonbridge, England, assignor to The Distillers Company Limited, Edinburgh, Scotland, a British company
Filed Oct. 18, 1965, Ser. No. 497,045
Claims priority, application Great Britain, Dec. 11, 1964, 50,508/64
Int. Cl. B08h 3/02
U.S. Cl. 134—37                                      7 Claims

ABSTRACT OF THE DISCLOSURE

Distribution of an anti-fouling liquid dispersed in a gas through a pipe system having a plurality of distribution points on or in association with an underwater surface. Includes improved component design to achieve more even and complete distribution of the anti-fouling liquid uniformly throughout all of the distribution points, by providing supplemental baffles within the piping in association with the primary dispersal devices. The supplemental baffles are usually generally funnel shape, capable of collecting liquid settling out of the gas mixture on the inner walls of the pipes, and have a deflecting surface arranged to reexpose this collected liquid to gas flowing in the pipe in such a manner that sufficient turbulence is caused in the liquid to redisperse it in the gas.

---

Figure 1:
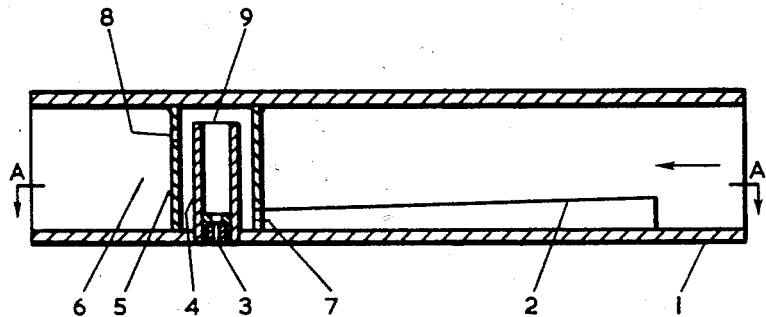

The present invention is concerned with improvements in and relating to apparatus and methods for reducing or preventing fouling of underwater surfaces.

Known apparatus for reducing or preventing fouling of underwater surfaces comprises a pipe system having a plurality of perforations along its length. Such a pipe system is attached to or near the underwater surface and a stream of anti-fouling liquid dispersed in a gas passed into the pipe system. It is desirable to use small amounts of anti-fouling liquid for economic reasons and to minimise pollution of the surrounding water. The known apparatus suffer the disadvantage that uneven quantities of anti-fouling liquid are distributed over the surface from each perforation since most of the liquid tends to issue from the perforations nearest the source of the stream leaving little or no distribution of liquid from the perforations furthest from this source, thus giving uneven protection to the surface.

We believe this uneven distribution to be due to liquid separating out of the gas stream and settling on the walls of the pipe.

It is an object of the present invention to provide an improved apparatus and method for reducing or preventing fouling of underwater surfaces in which this disadvantage is either eliminated or reduced.

The apparatus for reducing or preventing fouling of underwater surfaces according to the present invention comprises a pipe having a plurality of perforations along its length for distributing anti-fouling liquid dispersed in a gas, the pipe containing dispersing devices having means capable of collecting liquid settled on the pipe wall and having a deflecting surface arranged to expose the collected liquid to gas flowing in the pipe in such a manner that sufficient turbulence is caused in the liquid to redisperse it in the gas.

A dispersing device is preferably associated with each perforation in the pipe.

Each device can comprise an open ended trap within which a perforation in the pipe is located and a container enclosing the trap so that the open end of the trap can communicate with the inside of the container. The container having an inlet orifice through which liquid settled on the pipe wall can enter it and having an outlet orifice through which excess liquid dispersed in gas can pass out into the pipe. The surfaces of the container and trap form the deflecting surface.

The container is preferably a closed ended cylindrical sleeve and the trap is preferably an open ended cylindrical sleeve, said sleeves being coaxial.

Where the container and/or trap are cylindrical the most suitable internal diameter is in the range $5/16$ to $10/16$ of an inch and $3/8$ to $5/16$ of an inch respectively. The diameter should be selected to suit the rate of flow liquid in the pipe and the bore size of the pipe.

Most suitably the collecting means is a funnel shaped scoop and where the dispersing device comprises a container and trap the scoop is arranged so as to channel liquid in the pipe to the inlet orifice of the container.

Most suitably the bore size of the pipe should be within the range $\frac{1}{2}$ to 1 inch. When long lengths of pipe are used it is preferred to have a tapering bore. For example when using 1000 feet of pipe the first 500 feet can have a bore size of 1 inch, the next 300 feet a bore size of $\frac{3}{4}$ inch and the remaining 200 feet a bore size of $\frac{1}{2}$ inch. The tapering bore tends to minimise any drop in the rate of flow of gas and liquid as it passes along the pipe.

The intervals at which the perforations are spaced along the pipe depend mainly upon the shape of the surface to be protected. For example a suitable interval is from 5 to 20 feet. The internal diameter of the perforations is most suitably in the range 0.03 to 0.04 of an inch and preferably 0.035 of an inch.

A method for reducing or preventing fouling of underwater surfaces according to the present invention comprises subjecting a stream of anti-fouling liquid dispersed in a gas to conditions which cause sufficient turbulence at a plurality of places along the stream to redisperse liquid separating from the stream and distributing liquid dispersed in the gas against the underwater surface from a plurality of points along said stream.

The points along the stream are preferably substantially the same as the places at which the liquid is redispersed.

The conditions which cause turbulence in the stream can be caused by passing the stream over a deflecting surface which is so arranged as to cause sufficient turbulence to redisperse liquid separated from the stream as hereinbefore described.

The rate of flow of gas and liquid in the pipe is dependent upon the length and bore size of the pipe and the number of perforations. Where the pipe has a bore size in the preferred range of $\frac{1}{2}''$ to $1''$, a length of 1000 feet and 50 perforations the preferred rate of input of gas into the pipe is in the range 1100 to 1500 cubic feet of air per hour and of liquid 2.0 to 3.0 litres per hour.

Some examples of suitable anti-fouling liquids are mixtures of carriers such as kerosene and light diesel oils with toxic compounds such as the trialkyl or triaryl tin compounds described in B.P. 851,902.

The preferred gas is air.

An apparatus and method for distributing an anti-fouling liquid dispersed in a gas over an underwater surface according to the present invention is now described with reference to the drawing. However, it is to be understood that the invention is not limited to this specific description. In the drawing, FIGURE 1 shows a longitudinal section of a perforated pipe for carrying anti-fouling liquid dispersed in a gas which is suitable for attachment to or near an underwater surface.

Figure 2:
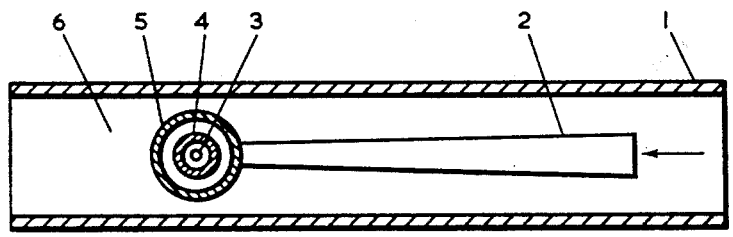

FIGURE 2 is a plan view of a section of FIGURE 1 along the line A—A'.

In these figures a unit 5-inch length of pipe 1 is shown containing a dispersing device 6. Each unit has a perforation 3 (internal diameter 0.040 inch) located within the dispersing device 6 which consists of a closed ended cylindrical sleeve 5 (internal diameter ½ inch) enclosing and coaxial with an open ended cylindrical sleeve or trap 4 (internal diameter ¼ inch) within which the perforation is located. The open end 9 of the sleepe or trap communicates with the container. The container has an inlet orifice 7 and an outlet orifice 8. The inlet orifice is located at the end of the container nearest the perforation in the pipe wall and faces the direction of flow of gas in the pipe. This direction of flow is shown by an arrow in the drawing. The outlet orifice 8 is situated at the other end of the container diagonally opposite to the inlet orifice thus allowing excess liquid and gas to escape from the container. The container has a supplemental funnel shaped collecting scoop 2 which is capable of collecting gas and liquid passing along the pipe and channelling it to the inlet orifice.

In operation a stream of kerosene containing an anti-fouling compound dispersed in air is passed into the unit as shown in the drawing by the arrow. Some kerosene tends to settle from this stream on the pipe wall. This kerosene is then driven along the pipe by the stream of kerosene dispersed in air until it reaches the supplemental collecting scoop or flute 2 where it is collected and channelled into the container 5 through the inlet orifice 7. The kerosene within the container is exposed on the inner surface of the container and surfaces of the trap to the kerosene/air stream in such a manner that sufficient turbulence is caused to redisperse it in the air. Some of the kerosene dispersed in air then passes into the sleeve or trap 4 and out of the pipe through the perforation in the pipe wall. Excess kerosene dispersed in air escapes from the outlet orifice 8.

In order to obtain data relating to flow rates of gas and anti-fouling liquid in a long length of pipe such as, for example, the type of system which would be used on the hull of a ship, a test rig was set up to simulate the conditions which would be encountered in a 1000 foot length of pipe having an internal bore of ¾ inch for the first 500 feet and ½ inch for the remainder. The pipe contains a number of units as hereinbefore described having a bore size for the first 500 feet of pipe of 1 inch and ¾ inch for the remainder to give intervals between each device as shown in the table.

The figures presented in the table are based upon a stream of kerosene containing an anti-fouling compound, the stream having a flow rate of 1350 cubic feet per hour for the air and 2.27 litres per hour for the kerosene.

Where the apparatus was modified by reducing the internal diameter of the perforations to 0.035 inch and operated in a similar manner to that described above the output from each jet was reduced to approximately one third of the output shown in the figures listed in the table.

TABLE

| Dispersing device No. | Position of dispersing device along pipe (ft.) | Bore size of unit (in.) | Air and kerosene pressure (p.s.i.g.) | Rate of flow: Air (cu. ft. free air (litres/hr.) | Rate of flow: Kersoene per hr.) | Dispersing device, air (cu. ft. free air per min.) | Output, kerosene (ml./hr.) |
|---|---|---|---|---|---|---|---|
| 1 | 0 | 1.0 | 30 | 1325 | 2.27 | 1.11 | 64 |
| 6 | 100 | 1.0 | 29 | 1195 | 2.04 | 1.11 | 64 |
| 11 | 200 | 1.0 | 28 | 1065 | 1.82 | 1.11 | 65 |
| 16 | 300 | 1.0 | 27 | 935 | 1.59 | 1.07 | 65 |
| 21 | 400 | 1.0 | 26 | 805 | 1.36 | 1.06 | 68 |
| 26 | 500 | 1.0 | 25 | 675 | 1.14 | 0.975 | 68 |
| 31 | 600 | 0.75 | 24 | 545 | 0.91 | 0.90 | 59 |
| 36 | 700 | 0.75 | 23 | 415 | 0.68 | 0.86 | 61 |
| 41 | 800 | 0.75 | 22 | 285 | 0.45 | 0.84 | 59 |
| 46 | 900 | 0.75 | 21 | 155 | 0.23 | 0.82 | 49 |
| 51 | 1,000 | 0.75 | 20 | 25 | 0.045 | 0.82 | 41 |

I claim:

1. An apparatus for reducing or preventing fouling of underwater surfaces which comprises a pipe having a plurality of perforations along its length for distributing anti-fouling liquid dispersed in a gas, the pipe containing dispersing devices having means supplemental thereto within said pipe capable of collecting liquid settled on the pipe wall and having a deflecting surface arranged to expose the collected liquid to gas flowing in the pipe in such a manner that sufficient turbulence is caused in the liquid to redisperse it in the gas.

2. An apparatus as claimed in claim 1 wherein the dispersing device comprises an open ended trap within which a perforation in the pipe is located and a container enclosing the trap so that the open end of the trap can communicate with inside of the container, the container having an inlet orifice through which liquid settled on the pipe wall can enter it and having an outlet orifice through which excess liquid dispersed in gas can pass out into the pipe, the surfaces of the container and trap forming the deflecting surface.

3. An apparatus as claimed in claim 2 wherein the trap is an open ended cylindrical sleeve and the container is a closed ended cylindrical sleeve said sleeves being coaxial.

4. An apparatus as claimed in claim 1 wherein the means capable of collecting liquid settled on the pipe wall is a funnel shaped scoop.

5. An apparatus as claimed in claim 1 wherein a dispersing device is associated with each perforation.

6. A method for reducing or preventing fouling of underwater surfaces comprising in combination the steps of:

(a) dispersing a stream of anti-fouling liquid into a gas flow wherein the mixture travels through a pipe system and is ejected at a plurality of points from a plurality of dispersal devices adjacent the underwater surface, (b) establishing substantial turbulence in said pipe in the area of said dispersal devices by providing supplemental collecting means within said pipe in association with said dispersal devices;

(c) collecting that liquid which has settled out of the mixture on the pipe walls by means of the supplemental collecting means, and (d) redispersing said collected settled-out liquid in said gas by subjecting it to the substantial turbulence of the gas mixture flow effected by the aforesaid disposition of the supplemental collecting means, whereby more effective and efficient dispersal of a greater percentage of the anti-fouling liquid is assured to produce more effective results.

7. The method as defined in claim 6 further including redispersing said collected liquid in close association with the points of ejecting of the mixture by disposing said supplemental collecting means in the form of funnel-like scoops directly adjacent said dispersal devices and disposing said dispersal devices at the same place as the ejection points on the underwater surface being treated.

References Cited

UNITED STATES PATENTS

| | | | |
|---|---|---|---|
| 1,445,839 | 2/1923 | Mahoney | 114—67.1 |
| 2,138,831 | 12/1938 | Brammer | 114—222 |
| 2,862,765 | 12/1958 | Wing | 21—108 XR |

FOREIGN PATENTS

| | | |
|---|---|---|
| 22,121 | 10/1936 | Australia. |
| 272,003 | 6/1927 | Great Britain. |

MORRIS O. WOLK, *Primary Examiner.*

J. T. ZATARGA, *Assistant Examiner.*

U.S. Cl. X.R.

21—58, 61; 114—222; 134—36, 34, 102; 137—602; 239—547, 553, 566